(12) United States Patent
Sotsu

(10) Patent No.: US 8,638,569 B2
(45) Date of Patent: Jan. 28, 2014

(54) ELECTRICAL APPARATUS

(75) Inventor: Shigeaki Sotsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/094,986

(22) Filed: Apr. 27, 2011

(65) Prior Publication Data

US 2011/0273859 A1    Nov. 10, 2011

(30) Foreign Application Priority Data

May 6, 2010   (JP) .................................. 2010-106713

(51) Int. Cl.
*H05K 1/14*   (2006.01)

(52) U.S. Cl.
USPC .......................... 361/803; 361/720; 361/760

(58) Field of Classification Search
USPC ........... 361/803, 749; 439/77, 218, 502, 505, 439/540.1
See application file for complete search history.

(56) References Cited

U.S. PATENT DOCUMENTS

| | | | | |
|---|---|---|---|---|
| 6,384,341 | B1 * | 5/2002 | Rothermel et al. | 174/255 |
| 7,329,818 | B2 * | 2/2008 | Matsuo | 174/261 |
| 7,446,624 | B2 * | 11/2008 | Kashiwakura | 333/34 |
| 2005/0041404 | A1 * | 2/2005 | Cady et al. | 361/749 |
| 2008/0143871 | A1 * | 6/2008 | Go | 348/374 |
| 2009/0066624 | A1 * | 3/2009 | Kim et al. | 345/89 |
| 2010/0265349 | A1 * | 10/2010 | Kim et al. | 348/222.1 |

FOREIGN PATENT DOCUMENTS

| | | |
|---|---|---|
| CN | 1829414 A | 9/2006 |
| CN | 101606444 A | 12/2009 |
| JP | 58-141135 A | 8/1983 |
| JP | 2009-032765 A | 2/2009 |

* cited by examiner

*Primary Examiner* — Tuan T Dinh
*Assistant Examiner* — Mukund G Patel
(74) *Attorney, Agent, or Firm* — Canon U.S.A., Inc. IP Division

(57) ABSTRACT

A first connector has a plurality of terminals arranged in the direction along a first pattern, and the first pattern is connected to a terminal disposed far from an image sensor in the plurality of terminals of the first connector. A second connector has a plurality of terminals arranged in the direction along a second pattern, and the second pattern is connected to a terminal disposed closer to an image processing circuit in the plurality of terminals of the second connector.

7 Claims, 10 Drawing Sheets

ELECTRICAL APPARATUS

BACKGROUND OF THE INVENTION

1. Field of the Invention

The present invention relates to an imaging apparatus, and in particular, to an imaging apparatus including an imaging circuit board having an image sensor and an image processing circuit board having an image processing circuit.

2. Description of the Related Art

Japanese Patent Application Laid-Open No. 2009-032765 discusses a configuration in which an imaging circuit board having an image sensor is connected to an image processing circuit board having an image processing circuit by a connector.

Drive frequency and resolution of an image sensor have been recently increased, which requires reduction of the number of signal lines and of power consumption, increase in noise immunity, and increase in driving speed of the image sensor. Consequently, an increasing number of image sensors have been used in low-amplitude differential signaling such as Low Voltage Differential Signaling (hereinafter, referred to as LVDS).

SUMMARY OF THE INVENTION

According to an aspect of the present invention, an electrical apparatus includes a first circuit board having an image sensor, a first connector, and a first differential signal pattern, the first differential signal pattern transmitting differential signals from the image sensor to the first connector; a second circuit board having an image processing circuit, a second connector, and a second differential signal pattern, the second differential signal pattern transmitting differential signals input to the second connector to the image processing circuit; wherein the first connector is connected to the second connector such that signals output from the image sensor are input to the image processing circuit, wherein the second connector has a plurality of terminals arranged in a direction along the second differential signal pattern, and the second differential signal pattern is connected to a terminal disposed closer to the image processing circuit in the plurality of terminals of the second connector.

According to the present invention, an imaging apparatus including a circuit board the size of which is not increased even when it is used in low-amplitude differential signaling such as LVDS.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
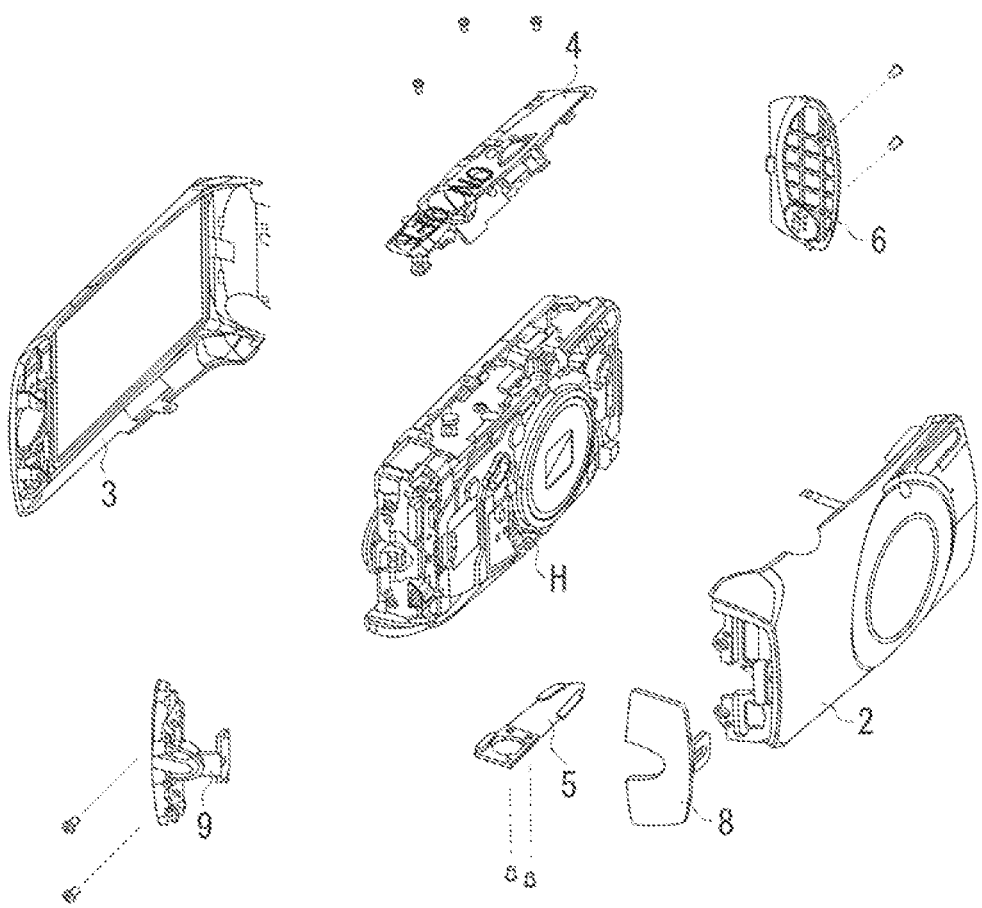
FIG. 1 is an exploded perspective view illustrating a digital camera 1 as an example of an imaging apparatus according to an exemplary embodiment of the present invention.

FIG. 1 is an exploded perspective view illustrating a digital camera 1 as an example of an electronic apparatus according to an exemplary embodiment of the present invention. In FIG. 1, a front cover 2, a rear cover 3, a top cover 4, bottom cover 5, a side cover 6, a jack cover 8, and a strap attachment member 9 are separated. In FIG. 1, a battery cover unit 7 is attached to a body unit H of the digital camera 1.

Figure 2:
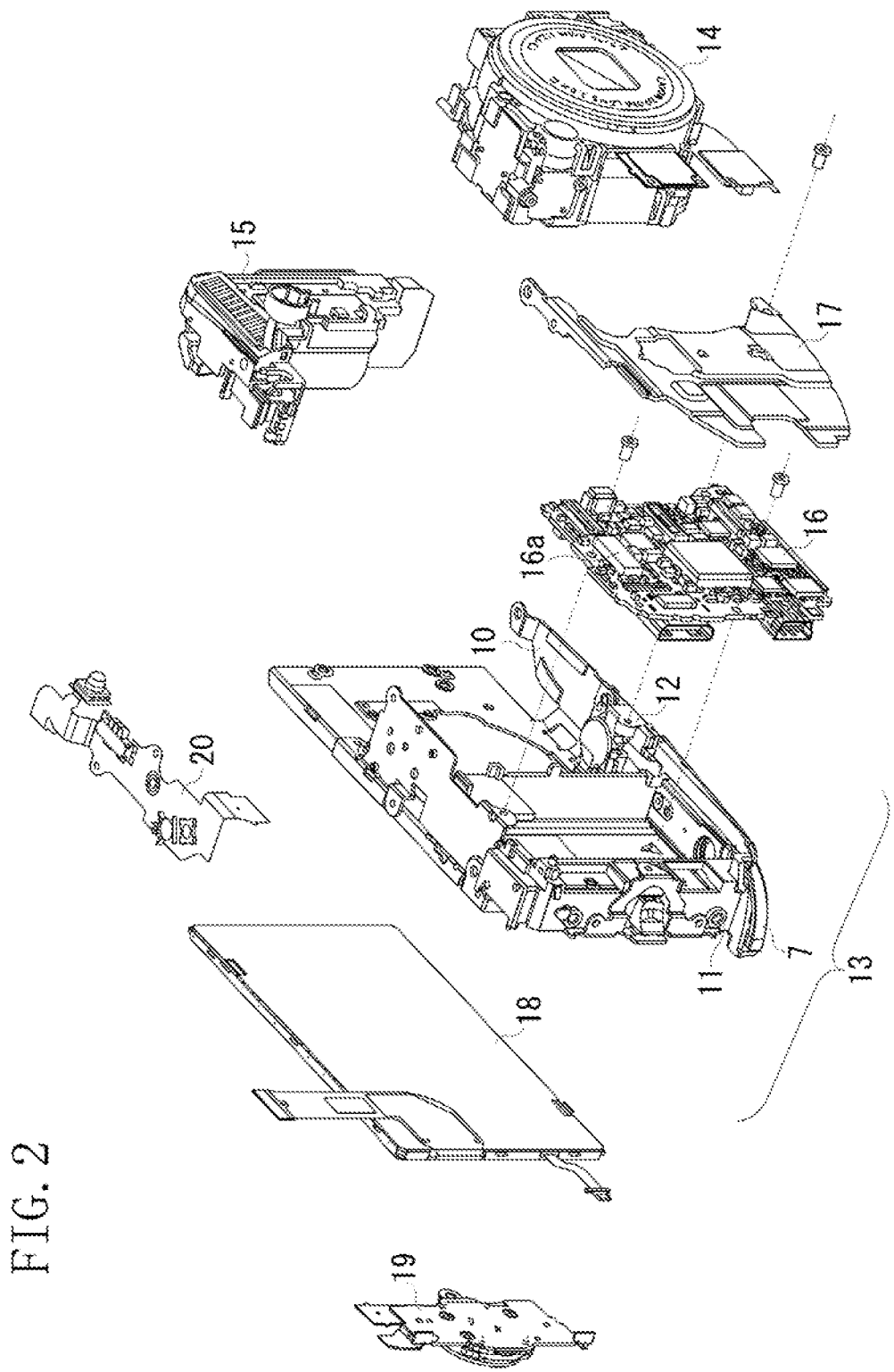
FIG. 2 is an exploded perspective view illustrating a body unit H of the digital camera 1.

FIG. 2 is an exploded perspective view illustrating further disassembled body unit H of the digital camera 1. The body unit H includes a chassis unit 13 consisting of a battery housing 11, a battery cover unit 7, and a tripod screw member 12 which are all coupled to a chassis 10 as an chassis member. To the chassis unit 13, a lens unit 14, a flash unit 15, an image processing circuit board 16, and a sink 17 are attached from the front of the digital camera 1.

A liquid crystal display unit 18 and an operation member 19 are attached to the chassis unit 13 from the rear side of the digital camera 1. A flexible wiring board 20 is further attached to the chassis unit 13 from the top face of the digital camera 1.

Figure 3A:
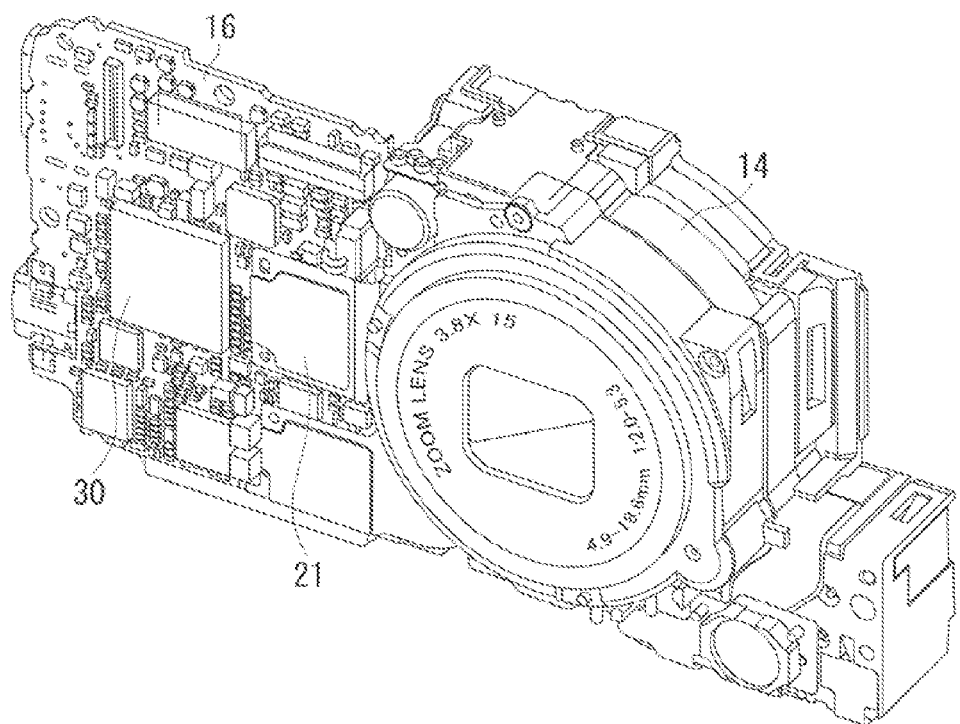
FIGS. 3A and 3B are exploded perspective views illustrating a connection state between a lens unit 14 and an image processing circuit board 16.
Figure 3B:
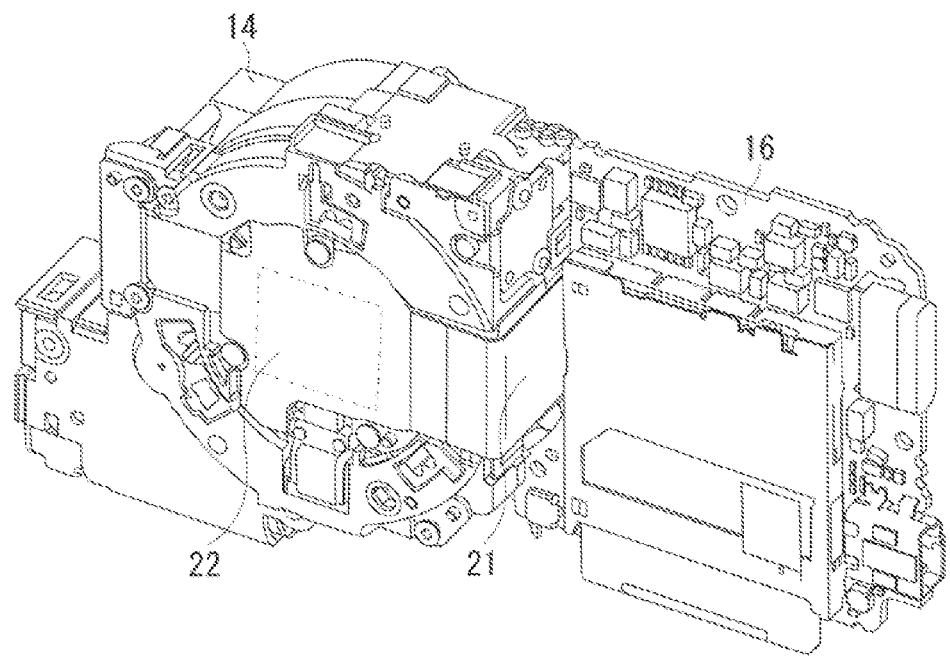

FIGS. 3A and 3B are exploded perspective views illustrating the connection state between the lens unit 14 and the image processing circuit board 16. FIG. 3A illustrates the lens unit 14 connected to the image processing circuit board 16 seen from the front side of the digital camera 1. The image processing circuit board 16 includes an image processing IC 30 as an image processing circuit. FIG. 3B illustrates the lens unit 14 connected to the image processing circuit board 16 seen from the rear side of the digital camera 1.

As illustrated in FIG. 3B, the lens unit 14 includes, on the rear side thereof, an imaging circuit board 21 to which a CMOS sensor 22 as an image sensor is mounted. The imaging circuit board 21 is disposed between the lens unit 14 and the image processing circuit board 16, and extends to the front side of the digital camera 1. The part of the imaging circuit board 21 exposed at the front side of the digital camera 1 is provided with a first board-to-board connector 23 as a first connector. The first board-to-board connector 23 is connected to a second board-to-board connector 24 provided to the image processing circuit board 16 as a second board-to-board connector.

Figure 4A:
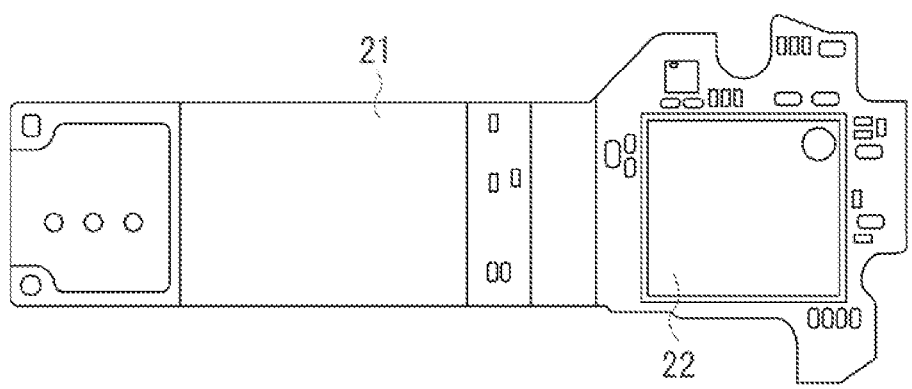
FIGS. 4A and 4B each illustrate an outer appearance of an imaging circuit board 21.
Figure 4B:
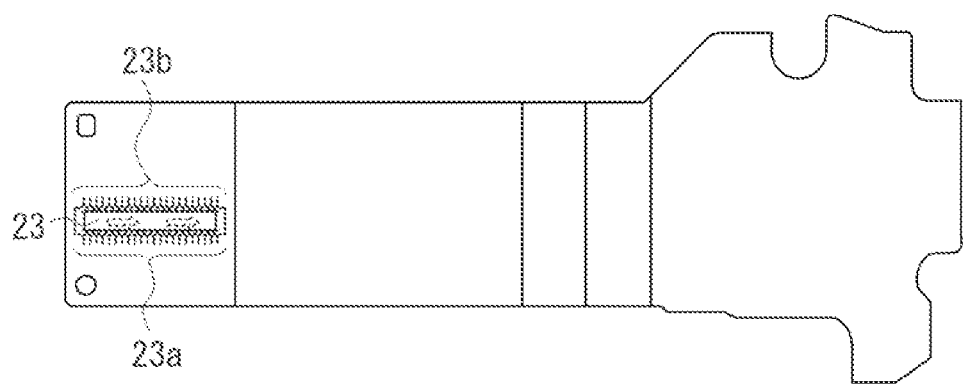

FIGS. 4A and 4B each illustrate an outer appearance of the imaging circuit board 21. FIG. 4A illustrates the imaging circuit board 21 seen from the side where the CMOS sensor 22 is mounted. FIG. 4B illustrates the imaging circuit board 21 seen from the side where the first board-to-board connector 23 is mounted. As illustrated in FIGS. 4A and 4B, the imaging circuit board 21 has the CMOS sensor 22 on one side thereof, and the first board-to-board connector 23 on the other side thereof.

Figure 5A:
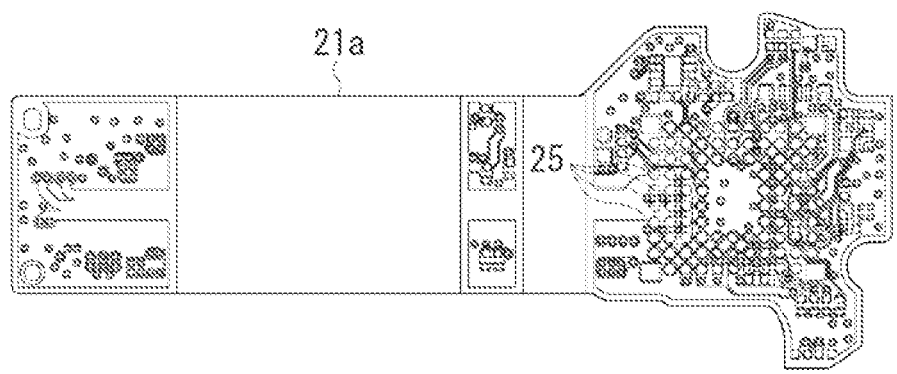
FIGS. 5A to 5D each illustrate a layer of an imaging circuit board 21.
Figure 5B:
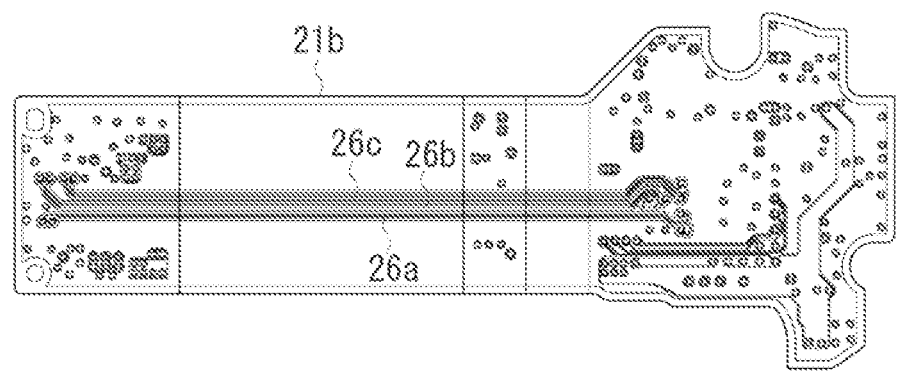
Figure 5C:
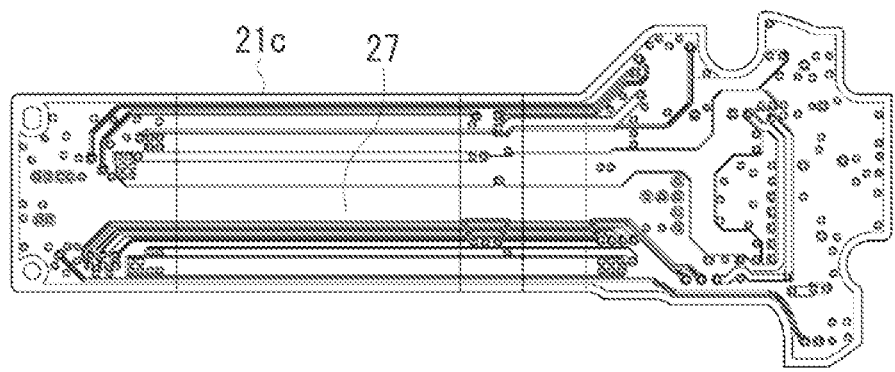
Figure 5D:
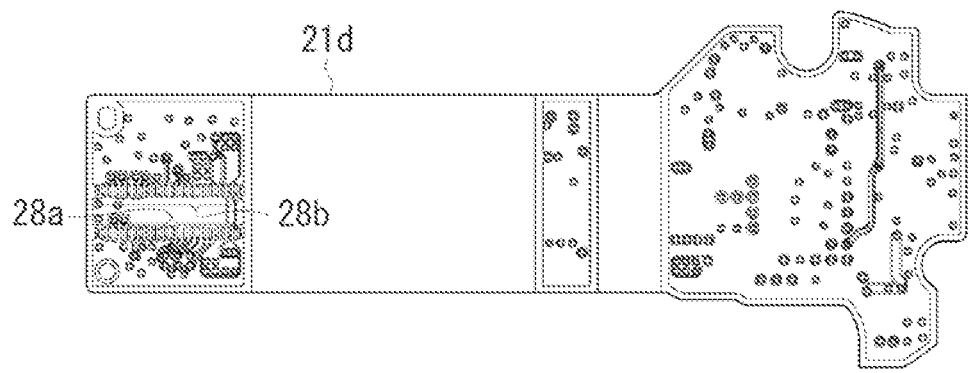

FIGS. 5A to 5D each illustrate a layer of the imaging circuit board 21. As illustrated in FIGS. 5A to 5D, the imaging circuit board 21 is a flexible wiring board composed of four layers. FIG. 5A illustrates a wiring pattern on a first layer 21a of the imaging circuit board 21. FIG. 5B illustrates a wiring pattern on a second layer 21b of the imaging circuit board 21. FIG. 5C illustrates a wiring pattern on a third layer 21c of the imaging circuit board 21. FIG. 5D illustrates a wiring pattern on a fourth layer 21d of the imaging circuit board 21.

As illustrated in FIG. 5A, the first layer 21a is provided with sensor lands 25 corresponding to a plurality of electrode portions of the CMOS sensor 22. As illustrated in FIG. 5B, the second layer 21b is provided with three pairs of first differential signal patterns 26a, 26b, and 26c that each transfer signals output from the CMOS sensor 22 in LVDS. The sensor lands 25 formed on the first layer 21a are connected to the three pairs of first differential signal patterns 26a, 26b, and 26c formed on the second layer 21b via through-holes respectively.

As illustrated in FIG. 5C, the third layer 21c is provided with a ground pattern 27 at the position overlapping the three pairs of first differential signal patterns 26a, 26b, and 26c. As illustrated in FIG. 5D, the fourth layer 21d is provided with connector lands 28a corresponding to a plurality of terminals 23a on the first board-to-board connector 23 and connector lands 28b corresponding to a plurality of terminals 23b on the first board-to-board connector 23.

The connector lands 28a and 28b formed on the fourth layer 21d are connected to the three pairs of first differential signal patterns 26a, 26b, and 26c formed on the second layer 21b via through-holes.

Figure 6:
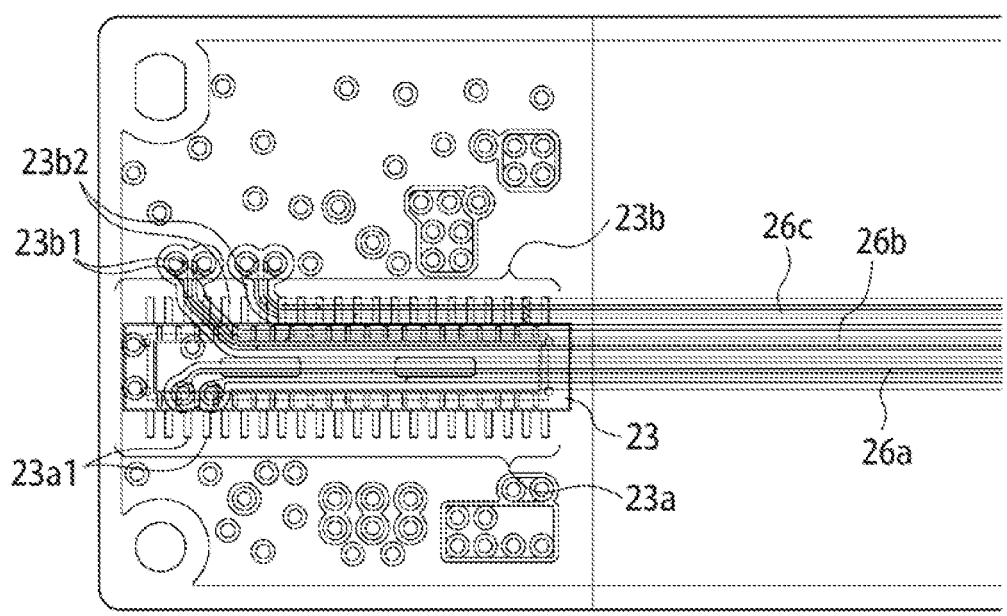
FIG. 6 is an enlarged view illustrating a region where a first board-to-board connector 23 is mounted.

FIG. 6 is an enlarged view illustrating the region where the first board-to-board connector 23 is mounted. The first board-to-board connector 23 includes the plurality of terminals 23a and the plurality of terminals 23b on both sides thereof respectively. In other words, the plurality of terminals 23a is arranged in line on one side of the first board-to-board connector 23, and the plurality of terminals 23b is arranged in line on the other side of the first board-to-board connector 23.

FIG. 6 also illustrates the three pairs of first differential signal patterns 26a, 26b, and 26c on the second layer 21b over the first board-to-board connector 23. As illustrated in FIG. 6, the first board-to-board connector 23 includes the plurality of terminals 23a and the plurality of terminals 23b respectively arranged in line along the direction in which the three pairs of first differential signal patterns 26a, 26b, and 26c extend.

In FIG. 6, the CMOS sensor 22 is mounted to the right side of the first board-to-board connector 23 on the imaging circuit board 21, and the CMOS sensor 22 is not mounted to the left side of the first board-to-board connector 23. As illustrated in FIG. 6, the pair of first differential signal patterns 26a runs through overlapping the region between the plurality of terminals 23a and 23b on the fourth layer 21d, and is respectively connected to terminals 23a1 that are disposed closer to the side without the CMOS sensor 22 being mounted, among the plurality of terminals 23a.

Similarly, the pair of first differential signal patterns 26b runs through overlapping the region between the plurality of terminals 23a and 23b on the fourth layer 21d, and is respectively connected to terminals 23b1 that are disposed closer to the side without the CMOS sensor 22 being mounted, among the plurality of terminals 23b. The pair of first differential signal patterns 26c runs through overlapping the region where the plurality of terminals 23b on the fourth layer 21d is connected, and is respectively connected to terminals 23b2 that are disposed closer to the side without the CMOS sensor 22 being disposed, among the plurality of terminals 23b.

In the present exemplary embodiment, the region between the plurality of terminals 23a and 23b can have only two pairs arranged thereon out of the three pairs of the first differential signal patterns.

In the present exemplary embodiment, the pair of first differential signal patterns 26a connected to the terminals 23a arranged on the one side of the first board-to-board connector 23, and the pair of first differential signal patterns 26b connected to the terminals 23b on the other side of the first board-to-board connector 23 are arranged in the region. With the arrangement, the two pairs of first differential signal patterns 26a and 26b can have approximately the same wire length.

It is assumed that the two pairs of first differential signal patterns 26b and 26c connected to the terminal 23b arranged on the other side of the first board-to-board connector 23 are arranged in the region between the plurality of terminals 23a and 23b.

Both of the two pairs of first differential signal patterns 26b and 26c are connected to the terminals 23b arranged on the other side of the first board-to-board connector 23, resulting in difference between the wire lengths of the two pairs of first differential signal patterns 26b and 26c. Accordingly, it is effective to arrange the pair of first differential signal patterns 26a and the pair of first differential signal patterns 26b in the region between the plurality of terminals 23a and 23b.

On the second layer 21b, the three pairs of first differential signal patterns 26a, 26b, and 26c are arranged adjacent to one another. AS a result, only one ground pattern 27 formed on the third layer 21c can cover all of the three pairs of first differential signal patterns 26a, 26b, and 26c. Accordingly, on the third layer 21c, wiring such as a power source line of the CMOS sensor 22 can be arranged in an area other than the ground patterns 27, thus enhancing placement efficiency.

The structure allows the imaging circuit board 21 to have the three pairs of first differential signal patterns 26a, 26b, and 26c thereon without increasing the size.

Figure 7:
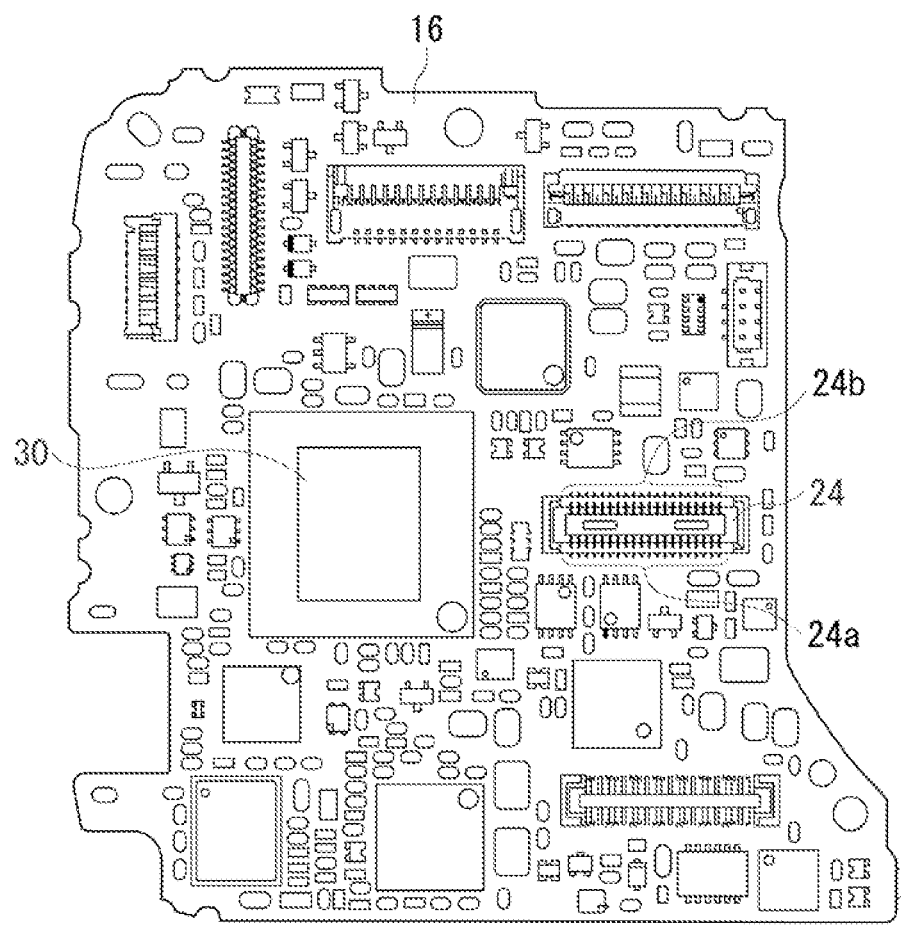
FIG. 7 illustrates an outer appearance of an image processing circuit board 16.

FIG. 7 illustrates an outer appearance of the image processing circuit board 16, and is a front view of the image processing circuit board 16 seen from the front of the digital camera 1. The image processing circuit board 16 includes the image processing IC 30, the second board-to-board connector 24, and the other electronic components.

Figure 8A:
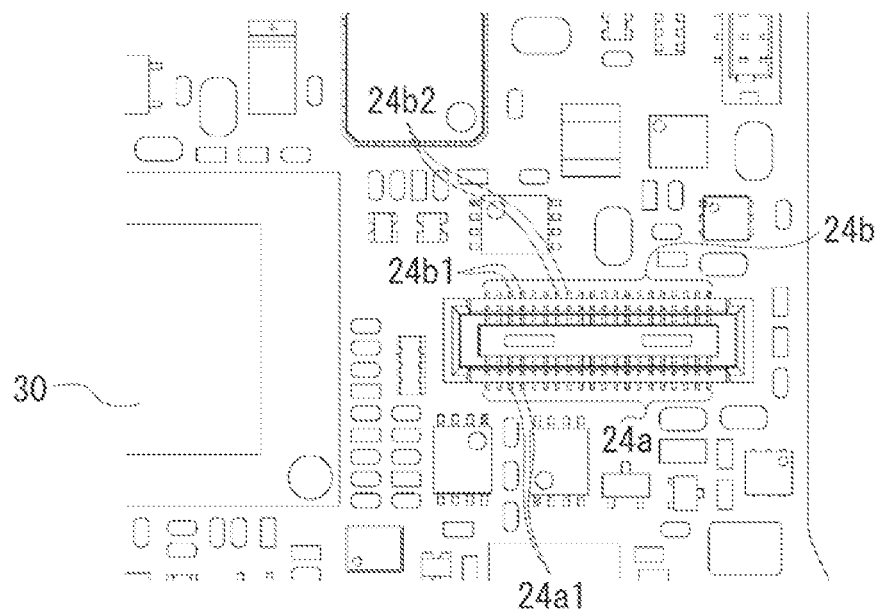
FIGS. 8A to 8C are enlarged views each illustrating a region where a second board-to-board connector 24 is mounted.
Figure 8B:
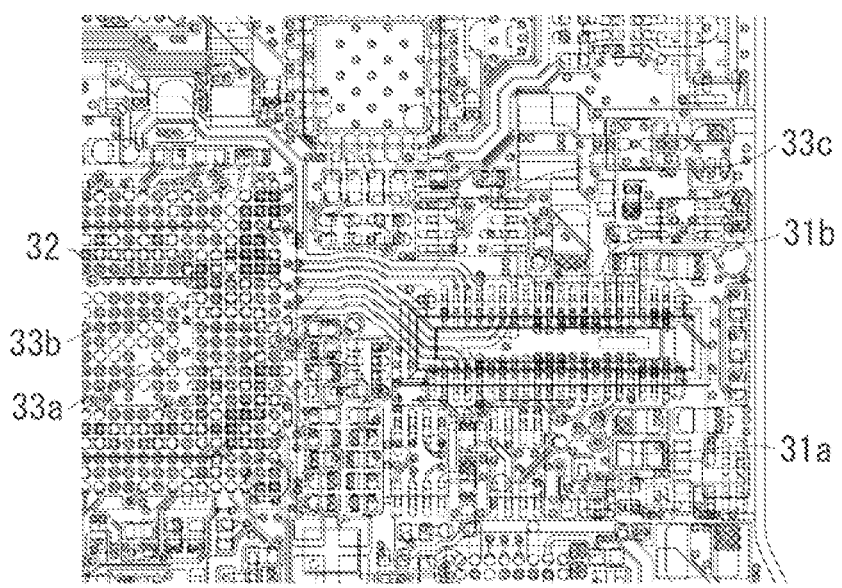
Figure 8C:
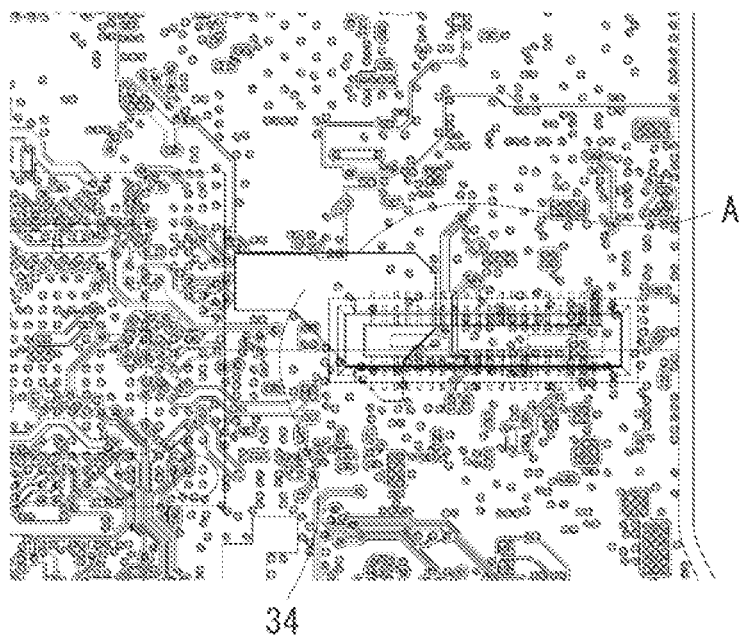

FIGS. 8A to 8C are enlarged views each illustrating a region on the image processing circuit board 16 where the second board-to-board connector 24 is mounted. FIG. 8A illustrates an outer appearance of the image processing circuit board 16 having the second board-to-board connector 24 mounted thereon. FIG. 8B illustrates a wiring pattern formed on the first layer of the image processing circuit board 16 in the area illustrated in FIG. 8A.

FIG. 8C illustrates a wiring pattern formed on the second layer of the image processing circuit board 16 in the area illustrated in FIG. 8A. The image processing circuit board 16 is a rigid printed circuit board consisting of eight layers. The third to eighth layers of the image processing circuit board 16 are not related to the present invention, and not described below.

As illustrated in FIG. 8A, the second board-to-board connector 24 includes a plurality of terminals 24a and 24b on both sides thereof respectively. In other words, the plurality of terminals 24a are arranged in line on one side of the second board-to-board connector 24, and the plurality of terminals 24b are arranged in line on the other side of the second board-to-board connector 24.

When the first board-to-board connector 23 is connected to the second board-to-board connector 24, the plurality of terminals 24a of the second board-to-board connector 24 is electrically connected to the plurality of terminals 23a of the first board-to-board connector 23, respectively. When the first board-to-board connector 23 is connected to the second board-to-board connector 24, the plurality of terminals 24b of the second board-to-board connector 24 is electrically connected to the plurality of terminals 23b of the first board-to-board connector 23, respectively.

As illustrated in FIG. 8B, the first layer of the image processing circuit board 16 has connector lands 31a corresponding to the plurality of terminals 24a of the second board-to-board connector 24, and connector lands 31b corresponding to the plurality of terminals 24b of the second board-to-board connector 24.

The first layer of the image processing circuit board 16 further has IC lands 32 corresponding to a plurality of electrode units of the image processing IC 30. The first layer of the image processing circuit board 16 further has three pairs of second differential signal patterns 33a, 33b, and 33c that connect the IC lands 32 to the connector lands 31a and 31b.

As illustrated in FIG. 8B, the second board-to-board connector 24 includes the plurality of terminals 24a and the plurality of terminals 24b each arranged in line along the direction in which the three pairs of second differential signal patterns 33a, 33b, and 33c extend.

In FIG. 8B, the image processing IC 30 is mounted on the left side of the second board-to-board connector 24 on the image processing circuit board 16, and the image processing IC 30 is not mounted on the right side of the second board-to-board connector 24. As illustrated in FIG. 8B, the pair of second differential signal patterns 33a runs through the region between the plurality of terminals 24a and 24b, and is respectively connected to terminals 24a1 that are disposed closer to the side having the image processing IC 30, among the plurality of terminals 24a.

Similarly, the pair of second differential signal patterns 33b runs through the region between the plurality of terminals 24a and 24b, and is respectively connected to terminals 24b1 that are disposed closer to the side having the image processing IC 30, among the plurality of terminals 24b. The pair of second differential signal patterns 33c runs on the outer side of the region where the second board-to-board connector 24 is mounted, and is respectively connected to terminals 24b2 that are disposed closer to the side having the image processing IC 30, among the plurality of terminals 24b.

In the present exemplary embodiment, the region between the plurality of terminals 24a and 24b can have only two pairs of the second differential signal patterns arranged therebetween out of the three pairs of the second differential signal patterns. In the present exemplary embodiment, the pair of second differential signal patterns 33a connected to the terminals 24a arranged on the one side of the second board-to-board connector 24, and the pair of second differential signal patterns 33b connected to the terminals 24b on the other side of the second board-to-board connector 24, are arranged in the region. This arrangement allows the two pairs of second differential signal pattern 33a and 33b to have approximately the same wire length.

For the same reason as that in the first differential signal patterns, it is effective to arrange the pair of second differential signal patterns 33a and the pair of second differential signal patterns 33b in the region between the plurality of terminals 24a and 24b.

In FIG. 8C, the region A lies under the region where the three pairs of second differential signal patterns 33a, 33b, and 33c are arranged. As illustrated in FIG. 8C, the region A has a ground pattern 34. Accordingly, the ground pattern 34 covers the three pairs of second differential signal patterns 33a, 33b, and 33c.

The second layer of the image processing circuit board 16 includes wiring patterns other than the ground pattern 34. These wiring patterns, arranged in the region other than those for the three pairs of second differential signal patterns 33a, 33b, and 33c, do not affect the three pairs of second differential signal patterns 33a, 33b, and 33c.

The third layer of the image processing circuit board 16 includes various wiring patterns, but these wiring patterns do not affect the three pairs of second differential signal patterns 33a, 33b, and 33c due to the ground pattern 34 formed on the second layer of the image processing circuit board 16.

In the present exemplary embodiment, the three pairs of second differential signal patterns 33a, 33b, and 33c are formed on the first layer of the image processing circuit board 16, and it is enough only to have a ground pattern formed on the second layer of the image processing circuit board 16.

If the three pairs of second differential signal patterns 33a, 33b, and 33c are arranged on the second layer of the image processing circuit board 16, the first and third layers of the image processing circuit board 16 each need to have a ground pattern formed. The present exemplary embodiment having the three pairs of second differential signal patterns 33a, 33b, and 33c formed on the first layer of the image processing circuit board 16 reduces a ground pattern, and, therefore, does not increase the size of the image processing circuit board.

In addition, in the present exemplary embodiment, the IC lands 32 and the connector lands 31a and 31b, and the three pairs of second differential signal patterns 33a, 33b, and 33c are all formed on the first layer of the image processing circuit board 16. Consequently differential signals of the CMOS sensor 22 that is input into the second board-to-board connector 24 are not transferred to other layers via the through-holes, and transferred only through the first layer to the image processing IC 30. This maintains high signal quality.

Furthermore, in the present exemplary embodiment, the three pairs of second differential signal patterns 33a, 33b, and 33c are connected to the terminals 24a1, 24b1, and 24b2 of the second board-to-board connector 24 that are disposed closer to the side on which the image processing IC 30 is mounted, respectively. This reduces the area on the first layer of the image processing circuit board 16 for the three pairs of second differential signal patterns 33a, 33b, and 33c, and enhances the wiring efficiency of the first layer of the image processing circuit board 16. The reduction in the area for the three pairs of second differential signal patterns 33a, 33b, and 33c then reduces the area of the ground pattern 34 on the second layer of the image processing circuit board 16.

The above-described structure enhances the wiring efficiency of the second layer of the image processing circuit board 16. As a result, even if low amplitude differential signaling such as LVDS is used, the size of the image processing circuit board 16 is not increased.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-106713 filed May 6, 2010, which is hereby incorporated by reference herein in its entirety.

What is claimed is:

1. An electrical apparatus comprising:
a first circuit board including an image sensor, a first connector, and a plural pair of first differential signal patterns transmitting differential signals from the image sensor to the first connector; and
a second circuit board including an image processor, a second connector, and a plural pair of second differential signal patterns transmitting differential signals from the second connector to the image processor;
wherein the first connector is connected to the second connector such that the differential signals output from the image sensor are input to the image processing circuit via the plural pair of first differential signal patterns and the plural pair of second differential signal patterns,
wherein the second connector includes a plurality of terminals arranged in line on a first and a second sides of the second connector along a longitudinal direction of the second connector,
wherein the second connector is located such that a shorter side of the second connector faces to the image processor,
wherein at least two pairs of second differential signal patterns extend through a region between the plurality of terminals arranged on the first side of the second connector and the plurality of terminals arranged on the second side of the second connector in the same direction,
wherein a first pair of second differential signal pattern extending through the region is connected to the plurality of terminals arranged on the first side of the second connector, and
wherein a second pair of second differential signal pattern extending through the region is connected to the plurality of terminals arranged on the second side of the second connector.

2. The electrical apparatus according to claim 1, wherein the first connector includes a plurality of terminals arranged in line on a first and a second sides of the first connector along a longitudinal direction of the first connector, and
wherein the first connector is located such that a shorter side of the first connector faces to the image sensor,
wherein at least two pairs of first differential signal patterns extend through a region between the plurality of terminals arranged on the first side of the first connector in the same direction and the plurality of terminals arranged on the second side of the first connector,
wherein a first pair of first differential signal patterns extending through the region are connected to the plurality of terminals arranged on the first side of the first connector, and
wherein a second pair of first differential signal pattern extending through the region is connected to the plurality of terminals arranged on the second side of the first connector.

3. The electrical apparatus according to claim 2, wherein the two pairs of first differential signal patterns are connected to terminals disposed far from the image sensor in the plurality of terminals of the first connector, and
wherein the two pairs of the second differential signal pattern are connected to terminals disposed closer to the image processor in the plurality of terminals of the second connector.

4. The electrical apparatus according to claim 2, wherein the differential signals are transmitted in low voltage differential signaling via the plural pair of first differential signal patterns and the plural pair of second differential signal patterns.

5. The electrical apparatus according to claim 2, wherein the first connector is a first board-to-board connector, and the second connector is a second board-to-board connector connectable with the first board-to-board connector.

6. The electrical apparatus according to claim 2, wherein the first circuit board has a plurality of layers,
wherein a plurality of lands of the image sensor are formed in a first layer of the first circuit board, and
wherein the plurality pair of second differential signal patterns are formed in a second layer of the first circuit board that is provided underneath the first layer of the first circuit board.

7. The electrical apparatus according to claim 2, wherein the second circuit board has a plurality of layers,
wherein a plurality of lands of the second connector are formed in a first layer of the second circuit board, and
wherein the plurality pair of second differential signal patterns are formed in the first layer of the second circuit board.

* * * * *